(12) United States Patent
Okada et al.

(10) Patent No.: US 8,414,753 B2
(45) Date of Patent: Apr. 9, 2013

(54) METHOD FOR FORMING COATING FILM

(75) Inventors: Eisaku Okada, Toyota (JP); Hirokazu Hayashi, Miyoshi (JP); Minoru Hanatani, Miyoshi (JP)

(73) Assignees: Toyota Jidosha Kabushiki Kaisha, Aichi (JP); Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 12/991,500

(22) PCT Filed: May 20, 2009

(86) PCT No.: PCT/JP2009/059636
§ 371 (c)(1),
(2), (4) Date: Nov. 8, 2010

(87) PCT Pub. No.: WO2009/145203
PCT Pub. Date: Dec. 3, 2009

(65) Prior Publication Data
US 2011/0068009 A1 Mar. 24, 2011

(30) Foreign Application Priority Data

May 26, 2008 (JP) .................. 2008-136735

(51) Int. Cl.
*C25D 13/06* (2006.01)
(52) U.S. Cl. ...................... 204/484; 204/505
(58) Field of Classification Search .................. 204/484, 204/505
See application file for complete search history.

(56) References Cited

U.S. PATENT DOCUMENTS 6,762,252 B2 * 7/2004 Kamikado et al. ............ 525/524

| | | | |
|---|---|---|---|
| 2003/0221964 A1 | 12/2003 | Kasahara et al. | |
| 2004/0244874 A1 | 12/2004 | Nakayama et al. | |
| 2007/0256592 A1 | 11/2007 | Shimoda et al. | |

FOREIGN PATENT DOCUMENTS

| JP | 2-282499 | 11/1990 |
|---|---|---|
| JP | 2003-155578 | 5/2003 |
| JP | 2003-166073 | 6/2003 |
| JP | 2003-226982 | 8/2003 |
| JP | 2003-253461 | 9/2003 |
| JP | 2003-293161 | 10/2003 |
| JP | 2003-328192 | 11/2003 |
| JP | 2006-28543 | 2/2006 |
| JP | 2006-169471 | 6/2006 |
| JP | 2006-239622 | 9/2006 |
| JP | 2007-100159 | 4/2007 |
| WO | 02/103080 | 12/2002 |
| WO | 2006/022426 | 3/2006 |
| WO | 2006/109862 | 10/2006 |

OTHER PUBLICATIONS

International Search Report issued Jul. 21, 2009 in International (PCT) Application No. PCT/JP2009/059636.
International Preliminary Report on Patentability together with English translation of the Written Opinion issued Jan. 11, 2011 in corresponding International (PCT) Application No. PCT/JP2009/059636.

* cited by examiner

*Primary Examiner* — Kishor Mayekar
(74) *Attorney, Agent, or Firm* — Wenderoth, Lind & Ponack, L.L.P.

(57) ABSTRACT

This invention concerns a method for forming a coating film on a metallic substrate by a multistage energization method at no less than two stages using an electrodeposition bath which comprises a water-based film-forming agent comprising zirconium compound and, as the base resin, an amino group-containing modified epoxy resin which is obtained through reaction of an epoxy resin with an amino group-containing compound, said epoxy resin having been obtained through reaction of a diepoxide compound, a bisphenol epoxy resin and bisphenols; whereby coated articles excelling in corrosion resistance are offered.

14 Claims, No Drawings

METHOD FOR FORMING COATING FILM

TECHNICAL FIELD

This invention relates to a method for forming a coating film on a metallic substrate by multistage energization system, using a water-based film-forming agent which excels in electrocoatability and stability, and also to the coated articles having excellent corrosion resistance, which are made using said method for forming a coating film.

BACKGROUND ART

Conventionally, metal substrates for industrial use are given a zinc phosphate treatment in the course of surface preparation, for improving corrosion resistance and adhesive property. Zinc phosphating agents, however, contain large quantities of phosphorus or nitrogen and also large quantities of heavy metals such as nickel, manganese and so on for improving the performance of resulting conversion coating films. In consequence, the chemical conversion treatment with such zinc phosphating agent adversely affects environment, and leaves great quantities of zinc phosphate or iron phosphate sludges after the treatment, giving rise to such problems as industry waste disposal.

Also for the purpose of improving corrosion resistance of industrial metal substrates, much space and time are required in a coating line for such processing steps as "degreasing—surface treatment—chemical conversion treatment—electrodeposition coating".

JP 2003-155578A proposed a chemical treating agent free from such problems, for iron- and/or zinc-based substrates, which contains substantially no phosphate ion but contains zirconium ion and/or titanium ion and fluorine ion. However, the chemical treating agent for iron- and/or zinc-based substrates as described in JP 2003-155578A has a problem in that satisfactory corrosion resistance cannot be secured unless a coating film is applied by a coating step after the treatment therewith.

WO 02/103080A discloses a metal surface treating method which enables reduction in the time and space required for the treating steps by the use of a composition for metal surface treatment, which composition comprises (A) a compound containing at least one metal element selected from Ti, Zr, Hf and Si and (B) a fluorine-containing compound as a supply source of fluorine ion, whereby precipitating a surface treating film excelling in corrosion resistance on the metal surface containing at least either iron or zinc, and dispensing with a surface adjustment (leveling) step. This treating method using the surface treating composition of WO 02/103080A, however, is subject to a problem of failing to secure satisfactory corrosion resistance, unless a coating film is applied by a coating step after the treatment.

JP 2003-166073A and JP 2003-226982A disclose a surface treating composition for lubricated steel sheet, which contains (A) amine-modified acrylic resin, (B) at least one compound selected from phosphoric acid-derived compounds, hydrofluoric acid, metal hydrofluoric acid and metal hydrofluoric acid salt, and (C) at least one compound selected from molybdenum compound, tungsten compound and vanadium compound; and which, when coated on zinc-plated steel sheet to be used for automobile bodies or household electric appliances, can provide lubricated steel sheet excelling in press-shapability and corrosion resistance. However, the steel sheet which is treated with the surface treating composition as disclosed in JP 2003-166073A or JP 2003-226982A fails to show satisfactory corrosion resistance unless it is further given a chemical conversion treatment and applied with a coating film, and hence the invention cannot achieve reduction in steps or space-saving.

JP 2003-293161A discloses a polymer composition for metal surface treating agent, which comprises a specific copolymer having salicylideneamino group and amino group. The steel sheet treated with the polymer composition for metal surface treating agent as described in JP 2003-293161A again fails to show satisfactory corrosion resistance, unless a coating film is applied thereon by a coating step, and the invention cannot lead to reduction in steps or space-saving.

Furthermore, JP Hei 2 (1990)-282499A discloses a method for forming a coating film on apertures of coating object having complex construction such as an automobile body having apertures of not more than 500 μm in width, by cationic electrodeposition coating according to multistage energization method. The multistage energization method as described in JP Hei 2 (1990)-282499A is effective for covering spaces in a coating object having apertures of not more than 500 μm in width and improving the object's corrosion resistance but is still short of securing satisfactory corrosion resistance.

Furthermore, JP 2003-328192A discloses a method for forming a multilayer coating film by electrocoating using multistage energization method, a cationic electrodeposition paint containing plural emulsions among which the differences in quantity of electricity necessary for starting their respective precipitation are unified. This method, however, is yet incapable of providing sufficient corrosion resistance.

Disclosure of the Invention

The object of the present invention is to offer a method for forming a film excelling in corrosion resistance on a metallic substrate by multistage energization system, using a water-based film-forming agent which excels in electrocoatability and stability.

We have engaged in concentrative studies to now discover that the above object can be accomplished by applying a specific film-forming agent onto a metallic substrate by a multistage energizing method under specific conditions, and come to complete the present invention.

Thus, the present invention provides a method for forming a coating film on a metallic substrate by a multistage energization method at no less than two stages, characterized by using an electrodeposition bath which comprises a water-based film-forming agent (I) comprising 30-20,000 ppm in terms of the metallic mass of zirconium compound (A) and, as the base resin, an amino group-containing modified epoxy resin (B) which is obtained through reaction of an epoxy resin (a) with an amino group-containing compound (b), said epoxy resin (a) having been obtained through reaction of a diepoxide compound (a1) represented by the following formula (1):

Formula (1)

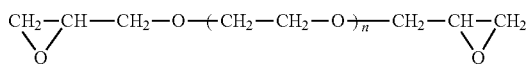

[in the formula, n is an integer of 1-50], a bisphenol epoxy resin (a2) and bisphenols (a3), wherein the first stage electrocoating is conducted by energizing at a coating voltage ($V_1$) of 1-50 V for 10-360 seconds with the metallic substrate serving as the cathode, and the second and subsequent stage electrocoating is conducted by energizing at a coating voltage ($V_2$) of 50-400 V for 60-600 seconds with the metallic substrate serving as the cathode, the difference between the coating voltage ($V_2$) and the coating voltage ($V_1$) being not less than 10 V.

The water-based film-forming agent (I) which is used in the film-forming method of this invention excels in electrocoatability and stability and, according to the film-forming method of the present invention, coated articles of excellent corrosion resistance can be provided.

According to the film-forming method of this invention, furthermore, coating film of superior corrosion resistance can be formed even on a metallic substrate of which zinc phosphating step has been omitted. Omission of the zinc phosphating step solves the problem of the sludge disposal. The method also enables omission of the chemical conversion step, which leads to space-saving and time-shortening in a coating line.

The reason for the excellent corrosion resistance of the coating film formed by the film-forming method of this invention is thought to be that the film (F1) precipitated on the coated object side contributes to suppression of corrosion under the coating film and the film (F2) precipitated onto the surface side intercepts corrosion-promoting substances (e.g., $O_2$, $Cl^-$, $Na^+$), each performing its allotted share of the two functions within the coating film structure.

DESCRIPTION OF EMBODIMENTS

The film-forming method of this invention forms a surface treatment film by a multistage energization method comprising no less than two stages, with use of a specific water-based film-forming agent (I). Hereafter the film-forming method of the invention is explained in further details.

Water-Based Film-Forming Agent (I):

The water-based film-forming agent (I) comprises 30-20,000 ppm, preferably 50-10,000 ppm, inter alia, 100-5,000 ppm, in terms of the metal quantity (as converted to mass) of zirconium compound (A) and, as the base resin, an amino group-containing modified epoxy resin (B) which is obtained through reaction of an epoxy resin (a) with an amino group-containing compound (b), said epoxy resin (a) having been obtained through reaction of a diepoxide compound (a1), a bisphenol epoxy resin (a2) and bisphenols (a3).

Zirconium Compound (A):

The first stage coating following the present invention is the step for forming the film (F1) by having zirconium-containing ions such as oxyzirconium ion, fluorozirconium ion and so on, which are generated from the zirconium compound (A), precipitate on the surface of a metallic substrate.

The zirconium compound (A) includes as the compounds which generate oxyzirconium ion, for example, zirconyl nitrate, zirconyl acetate and zirconyl sulfate; as the compounds which generate fluorozirconium ion, for example, zirconium hydrofluoric acid, zirconium hydrofluoric acid salts (e.g., sodium salt, potassium salt, lithium salt and ammonium salt) and so on. Of these, ammonium fluorozirconate is particularly preferred.

The water-based film-forming agent (I) can suitably contain, besides the zirconium compound (A), a compound which generates bismuth-containing ion. The compounds which generate bismuth-containing ions include, for example, inorganic bismuth-containing compounds such as bismuth chloride, bismuth oxychloride, bismuth bromide, bismuth silicate, bismuth hydroxide, bismuth trioxide, bismuth nitrate, bismuth nitrite and bismuth oxycarbonate; and organic bismuth-containing compounds such as bismuth lactate, triphenylbismuth, bismuth gallate, bismuth benzoate, bismuth citrate, bismuth methoxyacetate, bismuth acetate, bismuth formate and bismuth 2,2-dimethylolpropionate.

Resin Component:

The resin component used in the water-based film-forming agent (I) comprises a base resin and, where necessary, a crosslinking agent. From the standpoint of improving corrosion resistance, a cationic resin composition is suitable. As the base resin in the cationic resin composition, for example, one having in its molecules a group which is cationizable in an aqueous medium, such as amino, ammonium salt, sulfonium salt or phosphonium salt group can be used. As the resin species of the base resin, for example, epoxy resin, acrylic resin, polybutadiene resin, alkyd resin and polyester resin can be used.

According to the present invention, an amino group-containing epoxy resin (B) is used as at least a part of the base resin in consideration for corrosion resistance. The base resin preferably contains the amino group-containing epoxy resin (B) within a range of generally 40-80 mass %, preferably 45-75 mass %, inter alia, 50-70 mass %, based on the total solid content of the resin component.

Amino Group-Containing Modified Epoxy Resin (B):

The amino group-containing modified epoxy resin (B) is a resin which is obtained through reaction of an epoxy resin (a) with an amino group-containing compound (b), said epoxy resin (a) having been formed by reaction of a specific diepoxide compound (a1), a bisphenol epoxy resin (a2) and bisphenols (a3).

Diepoxide Compound (a1):

The diepoxide compound (a1) includes the compounds represented by the following formula (1):

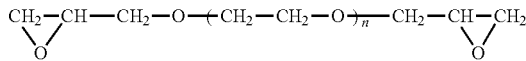

Formula (1)

[in the formula, n is an integer of 1-50, preferably 5-24, inter alia, 8-14], (which may be hereafter referred to as polyethylene glycol diglycidyl ether), preferably having a molecular weight within a range of generally 230-2,000, in particular, 340-1,200, from the viewpoint of stability of the water-based film-forming agent (I) and corrosion resistance of the resulting coating film.

As marketed products of such diepoxide compound (a1), for example, DENACOL EX-810, EX-821, EX-832, EX-841, EX-851 and EX-861 (trade names, Nagase Chemtex) can be named.

Bisphenol Epoxy Resin (a2):

The bisphenol epoxy resin (a2) useful for the preparation of the amino group-containing modified epoxy resin (B) includes the resins which are prepared through reaction of polyphenol compound with epihalohydrin. As such, those having a number-average molecular weight within a range of generally 340-2,000, in particular, 340-1,000 and an epoxy equivalent within a range of generally 170-1,500, in particular, 170-800, are suitable.

In the present specification, "number-average molecular weight" is the value determined from a chromatogram on RI refractometer using as the separation columns four columns of TSK GEL4000 HXL, TSK G3000 HXL, TSK G2500HXL and TSK G2000HXL (trade names, Tosoh Corp.) and as the eluent tetrahydrofuran for GPC, at 40° C. and at a flow rate of 1.0 ml/min.; and calibration curve of standard polystyrene, following the method prescribed by JIS K 0124-83.

As the polyphenol compound useful for the preparation of such bisphenol epoxy resin (a2), for example, bis(4-hydroxyphenyl)-2,2-propane [bisphenol A], bis(4-hydroxyphenyl) methane [bisphenol F], bis(4-hydroxycyclohexyl)methane [hydrogenated bisphenol A], 2,2-bis(4-hydroxycyclohexyl) propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-2 or 3-tert-butylphenyl)-2,2-propane, bis(2-hydroxynaphthyl)methane, tetra(4-hydroxyphenyl)-1,1,2,2-ethane, 4,4'-dihydroxydiphenylsulfone and cresol novolak can be named.

As the bisphenol epoxy resin (a2), those epoxy resins derived from bisphenol A which are represented by the following formula (2):

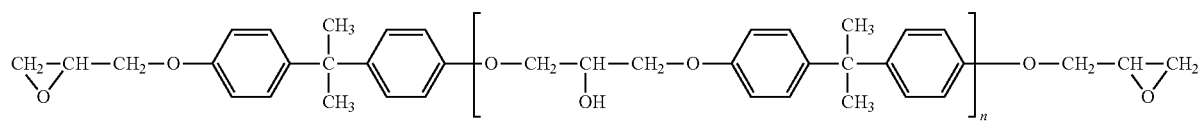

Formula (2)

[in the formula, n is an integer of 0-8, preferably 1-5, inter alia, 2-4]
are particularly preferred.

As such epoxy resins which are commercially available, for example, jER828EL, jER1002 and jER1004 (trade names, Japan Epoxy Resin Co.) can be named.
Bisphenols (a3);

The bisphenols (a3) useful for the preparation of amino group-containing modified epoxy resin (B) include the compounds represented by the following general formula (3):

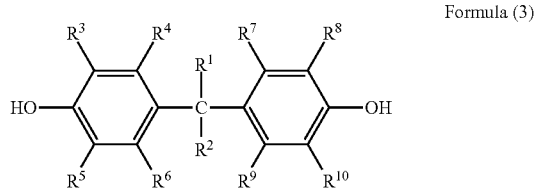

Formula (3)

[in the formula, each of $R^1$, $R^2$, $R^3$, $R^4$, $R^5$, $R^6$, $R^7$, $R^8$, $R^9$ and $R^{10}$ stands for hydrogen atom or a $C_{1-6}$ alkyl group]; more specifically, for example, bis(4-hydroxyphenyl)-2,2-propane [bisphenol A] and bis(4-hydroxyphenyl)methane [bisphenol F].
Epoxy Resin (a):

The epoxy resin (a) can be prepared through an addition reaction of above-described diepoxide compound (a1), bisphenol epoxy resin (a2) and bisphenols (a3). This addition reaction can be carried out by a method known per se. More specifically, the epoxy resin (a) can be obtained by mixing the diepoxide compound (a1), bisphenol epoxy resin (a2) and bisphenols (a3) in the presence of a catalyst such as a titanium compound, e.g., tetrabutoxytitanium or tetrapropoxytitanium; organotin compound, e.g., tin octylate, dibutyltin oxide or dibutyltin laurate; or metal compound, e.g., stannous chloride; and heating the mixture at about 100-about 250° C., for about 1-about 15 hours.

From the viewpoint of electrocoatability and stability, it is preferred to use the diepoxide compound (a1) within a range of generally 20-70 mass %, preferably 25-68 mass %, inter alia, 30-65 mass %, based on the total solid content of the diepoxide compound (a1), bisphenol epoxy resin (a2) and bisphenols (a3); and within a range of generally 15-50 mass %, preferably 18-45 mass %, inter alia, 20-42 mass %, based on the solid content of the amino group-containing modified epoxy resin (B).

Also from the viewpoint of electrocoatability and stability, the bisphenol epoxy resin (a2) can be used within a range of generally 11-53 mass %, preferably 13-48 mass %, inter alia, 16-42 mass %, based on the total solid content of the diepoxide compound (a1), bisphenol epoxy resin (a2) and bisphenols (a3).

The catalyst as above-named can be used generally in a quantity of 0.5-1,000 ppm, based on the total amount of the diepoxide compound (a1), bisphenol epoxy resin (a2) and bisphenols (a3). The addition reaction is usually carried out in a solvent, useful solvent including, for example, hydrocarbons such as toluene, xylene, cyclohexane and n-hexane; esters such as methyl acetate, ethyl acetate and butyl acetate; ketones such as acetone, methyl ethyl ketone, methyl isobutyl ketone and methyl amyl ketone; amides such as dimethylformamide and dimethylacetamide; alcohols such as methanol, ethanol, n-propanol and isopropanol; and mixtures of these solvents.
Amino Group-Containing Compound (b):

The amino group-containing compound (b) to be reacted with the epoxy resin (a) is not particularly limited in its species, so long as it contains at least one active hydrogen reactable with epoxy group and is capable of introducing amino groups into the epoxy resin (a) to cationize the latter, and any which has been heretofore used for cationizing epoxy resins can be used in similar manner, specific examples including ketimination products of ethanolamine, propanolamine, hydroxyethylaminopropylamine, diethylenetriamine, triethylenetetramine, tetraethylenepentamine and pentaethylenehexamine; diethanolamine, di(2-hydroxypropyl)amine, monomethylaminoethanol and monoethylaminoethanol.
Amino Group-Containing Modified Epoxy Resin (B):

The amino group-containing modified epoxy resin (B) can be obtained through addition reaction of above-described epoxy resin (a) with amino group-containing compound (b) by a method known per se. The addition reaction can be effected by heating the reactants in a suitable solvent at about 80-about 170° C., preferably at about 90-about 150° C., for about 1-6 hours, preferably about 1-5 hours.

Thus obtained amino group-containing modified epoxy resin (B) preferably has a number-average molecular weight within a range of generally 600-3,000, in particular, 1,000-2,500, and an amine value within a range of generally 30-100 mgKOH/g solid resin, in particular, 40-80 mgKOH/g solid resin.

The base resin in the water-based film-forming agent (I) can further suitably contain, in addition to the amino group-containing modified epoxy resin (B), per se known amino group-containing epoxy resin (C). As such amino group-containing epoxy resin (C), those obtained by addition reaction of epoxy resin (c1) with amine compound (c2) can be used. As the epoxy resin (c1), one obtained through reaction of polyphenol compound with epihalohydrin, e.g., epichlorohydrin, is particularly preferred, from the viewpoint of corrosion resistance of the film.

As the polyphenol compound useful for forming such epoxy resin (c1), for example, bis(4-hydroxyphenyl)-2,2-propane (bisphenol A), 4,4-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, tetra(4-hydroxyphenyl)-1,1,2,2-ethane, 4,4-dihydroxydiphenylsulfone (bisphenol S), phenol novolak, cresol novolak and the like can be named.

Also as the epoxy resin obtained by reacting such polyphenol compound with epichlorohydrin, those derived from bisphenol A which are expressed by the following formula are particularly preferred:

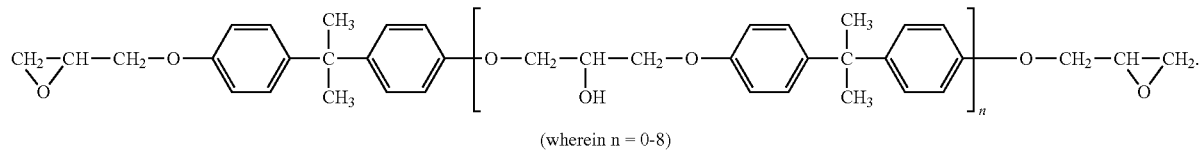

(wherein n = 0-8)

As the epoxy resin (c1), those having an epoxy equivalent generally within a range of 200-2,000, preferably 400-1,500, and number-average molecular weight generally within a range of 400-4,000, preferably 800-2,500 are suitable.

As the commercially available products of the epoxy resin, for example, jER828EL, jER1002, jER1004 and jER1007 (trade names, Japan Epoxy Resin Co.) can be named.

The amine compound (c2) to be reacted with the epoxy resin (c1) is not particularly limited, so long as it contains at least one active hydrogen reactable with epoxy group and can cationize the epoxy resin (c1), and those amine compounds similar to the earlier described amino group-containing compounds (b) in respect of the amino group-containing modified epoxy resin (B) can be used.

The amino group-containing epoxy resin (C) can be obtained through reaction of the epoxy resin (c1) with the amine compound (c2), by a method known per se. It is furthermore possible to modify the amino group-containing epoxy resin (C) with plasticity modifier or the like.

The water-based film-forming agent (I) may further obtain as the resin component a crosslinking agent, where necessary.

As the crosslinking agent, blocked polyisocyanate compounds formed upon blocking polyisocyanate compounds with suitable blocking agent are particularly suitable. As the polyisocyanate compounds, aromatic, alicyclic or aliphatic polyisocyanate compounds can be named. They can be used either alone or in combination of two or more.

Specific examples of aromatic polyisocyanate include 1,3- or 1,4-phenylene diisocyanate, 2,4- or 2,6-tolylene diisocyanate (TDI), crude TDI, 2,4'- or 4,4'-diphenylmethane diisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI, 1,5-naphthylene diisocyanate, 4,4',4"-triphenylmethane triisocyanate, m- or p-isocyanatophenylsulfonyl isocyanate and the like. Specific examples of aliphatic polyisocyanate include ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl)fumarate, bis(2-isocyanatoethyl)carbonate, 2-isocyanatoethyl-2,6-diisocyanatohexanoate and the like.

Specific examples of alicyclic polyisocyanate include isophorone diisocyanate (IPDI), dicyclohexylmethane-4,4'-diisocyanate (hydrogenated MDI), p-xylylene diisocyanate (XDI), α, α, α', α', -tetramethylxylylene diisocyanate (TMXDI), cyclohexylene diisocyanate and the like.

The blocking agent adds to isocyanate groups in the polyisocyanate compound to block the same. The blocked polyisocyanate compound formed upon addition of such blocking agent is stable at ambient temperature but dissociates the blocking agent when heated to about 100° C.-about 200° C., the baking temperature generally used for bake-hardening-type coating film, to regenerate the isocyanate groups.

As blocking agents satisfying such requirement, for example, lactam compounds such as ε-caprolactam and γ-butyrolactam; oxime compounds such as methyl ethyl ketoxime and cyclohexanoxime; phenolic compounds such as phenol, para-t-butylphenol and cresol; aliphatic alcohols such as n-butanol and 2-ethylhexanol; aromatic alkylalcohols such as phenylcarbinol and methylphenylcarbinol; and ether alcoholic compounds such as ethylene glycol monobutyl ether and diethylene glycol monoethyl ether can be named.

The blend ratio of the base resin and crosslinking agent in the resin component is: the base resin is generally within a range of 50-90 mass %, in particular, 60-80 mass %; and the crosslinking agent, generally within a range of 10-50 mass %, in particular, 20-40 mass %; based on the total solid content of the two components, in consideration of electrocoatability and stability of the water-based film-forming agent (I) and corrosion resistance of the film.

The resin component comprising the above-described base resin and crosslinking agent can be made water-dispersible with a neutralizing agent such as carboxylic acid and deionized water, and whereby obtained resin emulsion can be used for preparation of the water-based film-forming agent (I).

The water-based film-forming agent (I) can further contain other additives, where necessary, for example, pigment, catalyst, organic solvent, pigment dispersant, surface treating agent, surfactant and the like, each in a conventionally used amount.

As the pigment or catalyst, for example, coloring pigment such as titanium white and carbon black; extender such as clay, talc and baryta; rust-preventive pigment such as aluminum dihydrogentripolyphosphate and aluminum phosphomolybdate; organotin compound such as dibutyltin oxide and dioctyltin oxide; and tin compound such as aliphatic or aromatic carboxylate of dialkyltin, e.g., dibutyltin dilaurate, dioctyltin dilaurate, dibutyltin diacetate, dioctyltin dibenzoate and dibutyltin dibenzoate can be named.

The water-based film-forming agent (I) can be formulated, for example, by the following methods (1)-(3).

Method (1): a method comprising combining the resin component and optionally other additives; thoroughly mixing them to form a dissolved varnish; adding thereto, in an aqueous medium, a neutralizer selected from, for example, formic acid, acetic acid, lactic acid, propionic acid, citric acid, malic acid, sulfamic acid and mixtures of two or more of these acids, to disperse the varnish in the water; and blending the so formed emulsion with the zirconium compound (A).

Method (2): a method comprising adding to the zirconium compound (A) pigment, catalyst, other additives and water to disperse the pigment and prepare a pigment-dispersed paste in advance; and adding the paste to an emulsion of the resin component.

Method (3): a method comprising diluting the zirconium compound (A) with water and blending the same with an advancedly prepared bath of the water-based film-forming agent (I).

The electrodeposition bath containing the water-based film-forming agent (I) can be obtained by, for example, diluting the water-based film-forming agent as formulated as above (I) with deionized water or the like, to adjust the solid concentration in the bath to generally within a range of 5-40 mass %, preferably 8-25 mass %, and the pH, generally within a range of 3.0-9.0, preferably 4.0-7.0.

Suitable temperature of the bath is generally within a range of 5-45° C., preferably 10-40° C., inter alia, 20-35° C.

Coating Object:

As the metallic substrate to be used in the present invention as the coating object, for example, metallic steel plates such as cold-rolled steel sheet, hot dip galvanized steel sheet, electrogalvanized steel sheet, electrolytic zinc-iron electroplated steel sheet and organic composite plated steel sheet; and automobile bodies, bicycle parts, house machinery and tools, and other machinery and tools formed of these metallic steel sheets can be named.

Electrodeposition Coating:

According to the present invention, the film intended by the invention can be formed on the metallic substrate using an electrodeposition bath containing the water-based film-forming agent (I), by the hereafter described multistage energization system comprising at least two stages.

More specifically, the coating of a metallic substrate using the water-based film-forming agent (I) can be effected by carrying out the first stage electrodeposition coating using the above-described water-based film-forming agent (I)-containing electrodeposition bath, by energizing for 10-360 seconds, preferably 30-300 seconds, inter alia, 60-240 seconds, at a coating voltage ($V_1$) of 1-50 V, preferably 2-40 V, inter alia, 2.5-30 V, the metallic substrate serving as the cathode; and thereafter carrying out the second and subsequent stage electrodeposition coating by energizing for 60-600 seconds, preferably 90-240 seconds, inter alia, 120-220 seconds, at a coating voltage ($V_2$) of 50-400 V, preferably 100-350 V, inter alia, 125-300 V, while maintaining the difference(s) between the coating voltage ($V_2$) and the coating voltage ($V_1$) of at least 10 V, preferably within a range of 15-50 V, the metallic substrate serving as the cathode.

The following is thought to be the film precipitation mechanism of above multistage energization method.

First, the first stage energization causes a pH rise in the vicinity of the cathode, inducing hydrolysis of the zirconium compound in the water-based film-forming agent (I), whereby zirconium ion species, for example, zirconium-fluorine complex ion, precipitates on the metallic substrate to form a difficultly water-soluble film (F1) mainly of zirconium oxide.

Whereas, under the first stage energizing conditions the electric current density on the cathode is low, and the resin component diffuses (disperses) in the electrodeposition bath or precipitates onto the electrode to be re-dissolved, not coming to form a substantial film on the cathode.

Then, the second stage energization forms a film (F2) composed chiefly of the resin component and pigment, on the metallic substrate.

Suitable baking temperature of the formed coating film is, at the coating object's surface, within a range of from about 100-about 200° C., preferably from about 120-about 180° C. The baking time can generally be about 5-90 minutes, preferably about 10-50 minutes.

Thus, according to the method of the present invention coated articles having a coating film excelling in corrosion resistance can be provided, by the use of the water-based film-forming agent exhibiting excellent electrocoatability and stability.

EXAMPLES

Hereinafter the present invention is explained more specifically referring to Examples, it being understood that the invention is not limited to the given Examples only. In the Examples, "part" and "percent" signify "mass part" and "mass %".

Production Example 1

Amino Group-Containing Epoxy Resin Solution No. 1

A 2-liter separable flask equipped with a thermometer, reflux condenser and stirrer was charged with 638.9 parts of jER828EL (trade name, Japan Epoxy Resin Co., epoxy resin), 300.0 parts of DENACOL EX821 (note 1), 404.2 parts of bisphenol A and 0.2 part of dimethylbenzylamine, and their reaction was carried out at 130° C. until the product's epoxy equivalent reached 900.

Then 156.9 parts of diethanolamine was added, followed by the reaction at 120° C. for 4 hours and thereafter by addition of 375.0 parts of ethylene glycol monobutyl ether, to provide an amino group-containing epoxy resin solution No. 1 having a solid resin content of 80%.

The amino group-containing epoxy resin No. 1 had an amine value of 56 mgKOH/g, number-average molecular weight of 2,000, and the ratio (%) of the diepoxide compound (a1) of 20%.

Production Examples 2-5

Amino Group-Containing Epoxy Resin Solutions No. 2-No. 5

Amino group-containing epoxy resin solutions No. 2-No. 5 were prepared similarly to Production Example 1 except that the composition and the blending contents as in the following Table 1 were adopted.

TABLE 1

| | | | Production Example 1 | Production Example 2 | Production Example 3 | Production Example 4 | Production Example 5 |
|---|---|---|---|---|---|---|---|
| | Amino group-containing epoxy resin solution | | No. 1 | No. 2 | No. 3 | No. 4 | No. 5 |
| Resin Component | Blending Content | jER828EL | 638.9 | 337.6 | 36.4 | 789.5 | |
| | | DENACOL EX-821 (note 1) | 300.0 | 600.0 | 900.0 | 150.0 | |
| | | DENACOL EX-841 (note 2) | | | | | 1158.4 |
| | | bisphenol A | 404.2 | 405.5 | 406.7 | 403.6 | 184.8 |
| | | diethanolamine | 156.9 | 156.9 | 156.9 | 156.9 | 156.9 |
| | | ethylene glycol monobutyl ether | 375.0 | 375.0 | 375.0 | 375.0 | 375.0 |
| | Parameters | amine value (mgKOH/g) | 56 | 56 | 56 | 56 | 56 |
| | | number-average molecular weight | 2000 | 2000 | 2000 | 2000 | 2000 |
| | | solid content | 80 | 80 | 80 | 80 | 80 |
| | ratio (%) of diepoxide compound (a1) | | 20 | 40 | 60 | 10 | 77 |

The numerals in the "Blending content" are by mass parts.
(note 1) DENACOL EX821: trade name, Nagase Chemtex Co.; epoxy equivalent, 185
(note 2) DENACOL EX841: trade name, Nagase Chemtex Co.; epoxy equivalent, 372

Production Example 6

Amino Group-Containing Epoxy Resin Solution No. 6

A 2-liter separable flask equipped with a thermometer, reflux condenser and stirrer was charged with 1010 parts of jER828EL (trade name, Japan Epoxy Resin Co., epoxy resin), 390 parts of bisphenol A and 0.2 part of dimethylbenzylamine, and their reaction was carried out at 130° C. until the product's epoxy equivalent reached 700.

Then 160 parts of diethanolamine and 65 parts of ketimination products of diethylenetriamine with methyl isobutyl ketone were added, followed by 4 hours' reaction at 120° C. and thereafter by addition of 355 parts of ethylene glycol monobutyl ether, to provide an amino group-containing epoxy resin solution No. 6 having a solid resin content of 80%.

The amino group-containing epoxy resin No. 6 had an amine value of 70 mgKOH/g and a number-average molecular weight of 1,700.

Production Example 7

Production of Hardening Agent

To 222 parts of isophorone diisocyanate, 44 parts of methyl isobutyl ketone was added, and the temperature was raised to 70° C. Thereafter 174 parts of methyl ethyl ketoxime was dropped into the reaction system over 2 hours. While maintaining this temperature, the system was sampled with time until absence of absorption by the unreacted isocyanate was confirmed by infrared absorption spectroanalysis. Thus a blocked polyisocyanate compound (hardening agent) having a solid resin content of 90% was obtained.

Production Example 8

Production of Emulsion No. 1

The amino group-containing epoxy resin No. 1 having a solid resin content of 80% as obtained in Production Example 1, 87.5 parts (solid content, 70 parts), the hardening agent as obtained in Production Example 7, 33.3 parts (solid content, 30 parts) and 10% formic acid, 10.7 parts were mixed and stirred to homogeneity. Thereafter dropping 181 parts of deionized water into the mixture over about 15 minutes under vigorous stirring, emulsion No. 1 having a solid content of 32.0% was obtained.

Production Examples 9-17

Production of Emulsions No. 2-No. 10

Emulsions No. 2-No. 10 each having the composition and blending quantities as shown in the following Table 2 were prepared by the operations similar to Production Example 8.

TABLE 2

| | | | Production Example 8 | Production Example 9 | Production Example 10 | Production Example 11 | Production Example 12 |
|---|---|---|---|---|---|---|---|
| | | Emulsion | No. 1 | No. 2 | No. 3 | No. 4 | No. 5 |
| Resin Component | Base resin | amino group-containing epoxy resin solution No. 1 (diepoxide content, 20%) | 100.0 (80) | | | | |
| | | amino group-containing epoxy resin solution No. 2 (diepoxide content, 40%) | | 87.5 (70) | | 62.5 (50) | |
| | | amino group-containing epoxy resin solution No. 3 (diepoxide content, 60%) | | | 87.5 (70) | | 62.5 (50) |
| | | amino group-containing epoxy resin solution No. 4 (diepoxide content, 77%) | | | | | |
| | | amino group-containing epoxy resin solution No. 5 (diepoxide content, 10%) | | | | | |

TABLE 2-continued

|  |  |  |  |  |  | 25.0 (20) | 25.0 (20) |
|---|---|---|---|---|---|---|---|
|  |  | amino group-containing epoxy resin solution No. 6 (diepoxide content, 0%) |  |  |  |  |  |
|  | Cross-linking agent | harding agent solid content (90%) | 22.2 (20) | 33.3 (30) | 33.3 (30) | 33.3 (30) | 33.3 (30) |
| Neutralizer |  | 10% formic acid | 10.7 | 10.7 | 10.7 | 10.7 | 10.7 |
|  | deionized water |  | 179.6 | 181.0 | 181.0 | 181.0 | 181.0 |
|  | 32% emulsion |  | 312.5 (100) | 312.5 (100) | 312.5 (100) | 312.5 (100) | 312.5 (100) |
| ratio (%) of diepoxide compound (a1) in the resin component |  |  | 16.0 | 32.0 | 42.0 | 20.0 | 30.0 |

|  |  |  | Production Example 13 | Production Example 14 | Production Example 15 | Production Example 16 | Production Example 17 |
|---|---|---|---|---|---|---|---|
| Resin Component | Base resin | Emulsion | No. 6 | No. 7 | No. 8 | No. 9 | No. 10 |
|  |  | amino group-containing epoxy resin solution No. 1 (diepoxide content, 20%) |  |  | 62.5 (50) |  |  |
|  |  | amino group-containing epoxy resin solution No. 2 (diepoxide content, 40%) |  |  |  |  |  |
|  |  | amino group-containing epoxy resin solution No. 3 (diepoxide content, 60%) |  |  |  |  |  |
|  |  | amino group-containing epoxy resin solution No. 4 (diepoxide content, 77%) |  | 87.5 (70) |  | 62.5 (50) |  |
|  |  | amino group-containing epoxy resin solution No. 5 (diepoxide content, 10%) | 87.5 (70) |  |  |  |  |
|  |  | amino group-containing epoxy resin solution No. 6 (diepoxide content, 0%) |  |  | 25.0 (20) | 25.0 (20) | 87.5 (70) |
|  | Cross-linking agent | harding agent solid content (90%) | 33.3 (30) | 33.3 (30) | 33.3 (30) | 33.3 (30) | 33.3 (30) |
| Neutralizer |  | 10% formic acid | 10.7 | 10.7 | 10.7 | 10.7 | 10.7 |
|  | deionized water |  | 181.0 | 181.0 | 181.0 | 181.0 | 181.0 |
|  | 32% emulsion |  | 312.5 (100) | 312.5 (100) | 312.5 (100) | 312.5 (100) | 312.5 (100) |
| ratio (%) of diepoxide compound (a1) in the resin component |  |  | 7.0 | 53.9 | 10.0 | 38.5 | 0.0 |

The numerals show the blended amount and those in the parentheses show the solid content.

Production Example 18

Production of Pigment-Dispersing Resin

To 1010 parts of jER828EL (trade name, Japan Epoxy Resin Co., epoxy resin), 390 parts of bisphenol A, 240 parts of PLACCEL 212 (trade name, Daicel Chemical Industries, Ltd.; polycaprolactonediol; weight-average molecular weight, about 1,250) and 0.2 part of dimethylbenzylamine were added, and their reaction was carried out at 130° C. until the product's epoxy equivalent reached about 1090.

Then 134 parts of dimethylethanolamine and 150 parts of aqueous lactic acid solution of 90% concentration were added, followed by 4 hours' reaction at 120° C. Adjusting the solid content by addition of methyl isobutyl ketone, an ammonium salt type pigment-dispersing resin having a solid content of 60% was obtained.

Production Example 19

Production of Pigment-Dispersed Paste No. 1

Mixing and dispersing 8.3 parts (solid content, 5 parts) of the 60% pigment-dispersing resin as obtained in Production Example 18, 14 parts (solid content, 14 parts) of JR-600E (note 3), 0.3 part (solid content, 0.3 part) of CARBON MA-7 (note 4), 9.7 parts (solid content, 9.7 parts) of HYDRITE PXN (note 5), 1 part (solid content, 1 part) of dioctyltin oxide and 21.2 parts of deionized water, pigment-dispersed paste No. 1 having a solid content of 55 mass % was obtained.

Production Example 20

Production of Pigment-Dispersed Paste No. 2

Pigment-dispersed paste No. 2 was prepared by the operations similar to Production Example 19, except that the compounds as identified in the following Table 3 were used.

TABLE 3

|  |  |  | Production Example 19 | Production Example 20 |
|---|---|---|---|---|
|  | Pigment-dispersed paste |  | No. 1 | No. 2 |
| Dispersing resin | pigment-dipersing resin |  | 8.3 (5.0) | 8.3 (5.0) |
| Coloring pigment | JR-600E (Note 3) |  | 14.0 (14) | 14.0 (14) |
|  | CARBON MA-7 (Note 4) |  | 0.3 (0.3) | 0.3 (0.3) |
| Extender | HYDRITE PXN (Note 5) |  | 9.7 (9.7) | 9.7 (9.7) |
| Metal compound | Bismuth hydroxide |  |  | 1.0 (1.0) |

TABLE 3-continued

|  |  | Production Example 19 | Production Example 20 |
|---|---|---|---|
| Tin catalyst | dioctyltin oxide | 1.0 (1.0) | 1.0 (1.0) |
|  | Deionized water | 21.2 | 22.1 |
|  | 55% pigment-dispersed paste | 54.5 (30) | 56.4 (31) |

Parenthesized numerals show solid content.
(Note 3)
JR-600E: trade name, Tayca Corporation, titanium white
(Note 4)
CARBON MA-7: trade name, Mitsubishi Chemical Co., carbon black
(Note 5)
HYDRITE PXN: trade name, Georgia Kaolin Co., kaolin Production Example 21

Production of Film-Forming Agent No. 1

To 219 parts (solid content, 70 parts) of the emulsion No. 1 as obtained in Production Example 8, 54.5 parts (solid content, 30 parts) of the 55% pigment-dispersed paste No. 1 as obtained in Production Example 19 and 726.5 parts of deionized water were added to form a bath of 10% in solid content, to which 5.3 parts of ammonium fluorozirconate was added to provide film-forming agent No. 1.

Production Examples 22-32

Film-forming agents No. 2-No. 12 were prepared in the manner similar to Example 21, except that the composition and blending quantities as shown in the following Tables 4 and 5 were adopted.

TABLE 4

|  |  | Production Example 21 | Production Example 22 | Production Example 23 | Production Example 24 | Production Example 25 | Production Example 26 | Production Example 27 | Production Example 28 |
|---|---|---|---|---|---|---|---|---|---|
| Bath | Film-forming agent | No. 1 | No. 2 | No. 3 | No. 4 | No. 5 | No. 6 | No. 7 | No. 8 |
|  | Emulsion No. 1 diepoxide compound = 16.0% | 219.0 (70) |  |  |  |  | 219.0 (70) |  |  |
|  | Emulsion No. 2 diepoxide compound = 32.0% |  | 219.0 (70) |  |  |  |  | 219.0 (70) |  |
|  | Emulsion No. 3 diepoxide compound = 42.0% |  |  | 219.0 (70) |  |  |  |  | 219.0 (70) |
|  | Emulsion No. 4 diepoxide compound = 20.0% |  |  |  | 219.0 (70) |  |  |  |  |
|  | Emulsion No. 5 diepoxide compound = 30.0% |  |  |  |  | 219.0 (70) |  |  |  |
|  | Pigment-dispersed paste No. 1 | 54.5 (30) | 54.5 (30) | 54.5 (30) | 54.5 (30) | 54.5 (30) |  |  |  |
|  | Pigment-dispersed paste No. 2 |  |  |  |  |  | 56.4 (31) | 56.4 (31) | 56.4 (31) |
|  | Deionized water | 726.5 | 726.5 | 726.5 | 726.5 | 726.5 | 734.6 | 734.6 | 734.6 |
|  | 10% bath | 1000 (100) | 1000 (100) | 1000 (100) | 1000 (100) | 1000 (100) | 1010 (101) | 1010 (101) | 1010 (101) |
|  | Ammonium fluorozirconate | 5.3 (5.3) | 5.3 (5.3) | 5.3 (5.3) | 5.3 (5.3) | 5.3 (5.3) | 5.3 (5.3) | 5.3 (5.3) | 5.3 (5.3) |

TABLE 5

|  |  | Production Example 29 | Production Example 30 | Production Example 31 | Production Example 32 |
|---|---|---|---|---|---|
| Bath | Film-forming agent | No. 9 | No. 10 | No. 11 | No. 12 |
|  | Emulsion No. 6 diepoxide compound = 7.0% | 219.0 (70) |  |  |  |
|  | Emulsion No. 7 diepoxide compound = 53.9% |  | 219.0 (70) |  |  |
|  | Emulsion No. 8 diepoxide compound = 10.0% |  |  | 219.0 (70) |  |
|  | Emulsion No. 9 diepoxide compound = 38.5% |  |  |  | 219.0 (70) |
|  | Pigment-dispersed paste No. 1 | 54.5 (30) | 54.5 (30) | 54.5 (30) | 54.5 (30) |
|  | Pigment-dispersed paste No. 2 |  |  |  |  |
|  | Deionized water | 726.5 | 726.5 | 726.5 | 726.5 |
|  | 10% bath | 1000.0 (100) | 1000.0 (100) | 1000.0 (100) | 1000.0 (100) |
|  | Ammonium fluorozirconate | 5.3 (5.3) | 5.3 (5.3) | 5.3 (5.3) | 5.3 (5.3) |

Production Example 33

To 219 parts (solid content 70 parts) of the emulsion No. 10 as obtained in Production Example 14, 54.5 parts (solid content, 30 parts) of the 55% pigment-dispersed paste No. 1 as obtained in Production Example 19 and 726.5 parts of deionized water were added to form a bath having a solid content of 10%. Further 5.3 parts of ammonium fluorozirconate was added to the bath to provide film-forming agent No. 13.

Production Example 34

Film-forming agent No. 14 was obtained in the manner similar to Production Example 33 except that the composition and blending quantities as shown in the following Table 6 were used.

TABLE 6

| | | Production Example 33 | Production Example 34 |
|---|---|---|---|
| Bath | Film-forming agent | No. 13 | No. 14 |
| | Emulsion No. 10 diepoxide compound = 0% | 219.0 (70) | 219.0 (70.0) |
| | Pigment-dispersed paste No. 1 | 54.5 (30) | |
| | Pigment-dispersed paste No. 2 | | 56.9 (31.3) |

TABLE 6-continued

| | Production Example 33 | Production Example 34 |
|---|---|---|
| Deionized water | 726.5 | 737.1 |
| 10% bath | 1000 (100) | 1013.0 (101.3) |
| Ammonium fluorozirconate | 5.3 (5.3) | 5.3 (5.3) |

Example 1

A bath of the film-forming agent No. 1 was adjusted to 28° C., and into which cold-rolled steel sheet (70 mm×150 mm×0.8 mm) serving as the cathode was immersed (interpolar distance: 15 cm). The first stage energization was effected under the conditions of: the coating voltage: 5V and energization time: 60 seconds, and the second stage, under the conditions of: the coating voltage: 150 V and energization time: 180 seconds, to make the dry film thickness 20 μm. Thus formed film was baked at 170° C. for 20 minutes with an electric dryer to provide a test panel No. 1.

Examples 2-12

Test panels No. 2-No. 12 were prepared in the manner similar to Example 1, except that the film-forming agent and energization conditions as shown in Tables 7 and 8 were used.

TABLE 7

| Test Panel | | Example 1 No. 1 | Example 2 No. 2 | Example 3 No. 3 | Example 4 No. 4 | Example 5 No. 5 | Example 6 No. 6 | Example 7 No. 7 | Example 8 No. 8 |
|---|---|---|---|---|---|---|---|---|---|
| Film-forming Agent | | No. 1 | No. 2 | No. 3 | No. 4 | No. 5 | No. 6 | No. 7 | No. 8 |
| First Stage | voltage (V) | 5 | 5 | 5 | 5 | 10 | 15 | 10 | 10 |
| | sec. | 60 | 60 | 60 | 60 | 50 | 30 | 60 | 60 |
| Second Stage | voltage (V) | 150 | 180 | 220 | 100 | 260 | 160 | 160 | 200 |
| | sec. | 180 | 180 | 240 | 200 | 120 | 120 | 120 | 120 |
| Electrocoatability (note 6) | | ○ | ○ | ○ | ○ | ○ | ○ | ○ | ○ |
| Stability of Film-forming Agent (note 7) | | ⊙ | ⊙ | ⊙ | ⊙ | ⊙ | ⊙ | ⊙ | ⊙ |
| Corrosion Resistance (note 8) | | ⊙ | ⊙ | ⊙ | ⊙ | ⊙ | ⊙ | ⊙ | ⊙ |
| Exposure Resistance (note 9) | | ○ | ○ | ○ | ○ | ○ | ⊙ | ⊙ | ⊙ |

TABLE 8

| Test Panel | | Example 9 No. 9 | Example 10 No. 10 | Example 11 No. 11 | Example 12 No. 12 |
|---|---|---|---|---|---|
| Film-forming Agent | | No. 9 | No. 10 | No. 11 | No. 12 |
| First Stage | voltage (V) | 5 | 5 | 5 | 5 |
| | sec. | 60 | 60 | 60 | 60 |
| Second Stage | voltage (V) | 270 | 250 | 250 | 180 |
| | sec. | 150 | 150 | 30 | 150 |
| Electrocoatability (note 6) | | ○ | ○ | ○ | ○ |
| Stability of Film-forming Agent (note 7) | | ○ | ⊙ | ○ | ⊙ |
| Corrosion Resistance (note 8) | | ⊙ | ○ | ⊙ | ○ |
| Exposure Resistance (note 9) | | ○ | ○ | ○ | ○ |

Comparative Examples 1-8

Test panels No. 13-No. 20 were prepared in the manner similar to Example 1, except that the film-forming agent and energization conditions as shown in Table 9 were used.

TABLE 9

| Test Panel | | Comparative Example 1 No. 13 | Comparative Example 2 No. 14 | Comparative Example 3 No. 15 | Comparative Example 4 No. 16 | Comparative Example 5 No. 17 | Comparative Example 6 No. 18 | Comparative Example 7 No. 19 | Comparative Example 8 No. 20 |
|---|---|---|---|---|---|---|---|---|---|
| Film-forming Agent | | No. 1 | No. 2 | No. 1 | No. 1 | No. 2 | No. 2 | No. 13 | No. 14 |
| First Stage | voltage (V) | | | 110 | 60 | 80 | 60 | 5 | 5 |

TABLE 9-continued

| Test Panel | | Comparative Example 1 No. 13 | Comparative Example 2 No. 14 | Comparative Example 3 No. 15 | Comparative Example 4 No. 16 | Comparative Example 5 No. 17 | Comparative Example 6 No. 18 | Comparative Example 7 No. 19 | Comparative Example 8 No. 20 |
|---|---|---|---|---|---|---|---|---|---|
| | sec. | | | 30 | 60 | 30 | 90 | 60 | 60 |
| Second Stage | voltage (V) | 260 | 260 | 260 | 240 | 270 | 270 | 250 | 250 |
| | sec. | 180 | 180 | 180 | 150 | 180 | 150 | 150 | 150 |
| Electrocoatability (note 6) | | ◯ | ◯ | ◯ | ◯ | ◯ | ◯ | X | X |
| Stability of Film-forming Agent (note 7) | | ⊙ | ⊙ | ⊙ | ⊙ | ⊙ | ⊙ | X | X |
| Corrosion Resistance (note 8) | | X | X | X | Δ | X | Δ | X | X |
| Exposure Resistance (note 9) | | X | X | X | X | X | X | X | X |

(Note 6) Electrocoatability:

After carrying out the electrocoating under the conditions to form the 20 μm-thick dry coating film, the film was washed and bake-dried at 170° C. for 20 minutes. Then the film was visually evaluated in respect of foaming, cratering, pinholing and smoothness:

◯: good and no problem;

Δ: degradation observed in respect of foaming, cratering, pinholing or smoothness;

x: marked degradation observed in respect of foaming, cratering or smoothness.

(Note 7) Stability of Film-Forming Agent:

Each of the film-forming agents was stirred in a sealed container at 30° C. for 30 days. Thereafter each the total amount of the film-forming agent was filtered through a 400 mesh-filtration net. The amount of the residue (mg/L) left on the filtration net was measured:

⊙: less than 5 mg/L,

◯: no less than 5 mg/L but less than 10 mg/L,

Δ: no less than 10 mg/L but less than 15 mg/L, x: no less than 15 mg/L.

(Note 8) Corrosion Resistance:

Coating film on each test panel was cross-cut with a knife to the depth reaching the substrate, and the test panel was given a salt spray test for 480 hours following JIS Z-2371. Corrosion resistance was evaluated by the following standard according to widths of rust and blister development from the knife cuts:

⊙: the maximum width of rusting or blistering from the cuts was less than 2 mm (single side);

◯: the maximum width of rusting or blistering from the cuts was no less than 2 mm but less than 3 mm (single side);

Δ: the maximum width of rusting or blistering from the cuts was no less than 3 mm but less than 4 mm (single side); and x: the maximum width of rusting or blistering from the cuts was 4 mm or more (single side).

(Note 9) Exposure Resistance:

The test panels were applied with WP-300 (trade name, Kansai Paint Co.), a water-based intermediate paint, by spray-coating method, to a hardened film thickness of 25 μm, and baked at 140° C.×30 minutes in an electric hot air dryer. Further onto the intermediate coating film NEO AMILAC 6000 (trade name, Kansai Paint Co.), a top paint, was applied by spray coating method, to a hardened film thickness of 35 μm, which was subsequently baked at 140° C.×30 minutes in an electric hot air dryer, to provide panels for the exposure test.

The coating films on the exposure test panels were cross-cut with a knife to the depth reaching the substrate, and the panels were exposed to the open air in horizontal position for a year in Chikura-cho, Chiba Prefecture, Japan. The exposure resistance was evaluated according to the rusting and blistering widths from the knife cuts, by the following standard:

⊙: the maximum width of rusting or blistering from the cuts was less than 2 mm (single side), ◯: the maximum width of rusting or blistering from the cuts was no less than 2 mm but less than 3 mm (single side), Δ: the maximum width of rusting or blistering from the cuts was no less than 3 mm but less than 4 mm (single side), and x: the maximum width of rusting or blistering from the cuts was no less than 4 mm (single side).

The invention claimed is:

1. A method for forming a coating film on a metallic substrate by a multistage energization method at no less than two stages, characterized by using an electrodeposition bath which comprises a water-based film-forming agent (I) comprising 30-20,000 ppm in terms of the metallic mass of zirconium compound (A) and, as the base resin, an amino group-containing modified epoxy resin (B) which is obtained through reaction of an epoxy resin (a) with an amino group-containing compound (b), said epoxy resin (a) having been obtained through reaction of a diepoxide compound (a1) represented by the following formula (1):

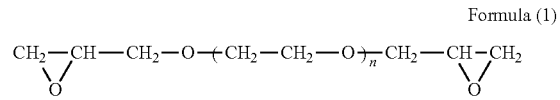

Formula (1)

[in the formula, n is an integer of 1-50], a bisphenol epoxy resin (a2) and bisphenols (a3), wherein the first stage electrocoating is conducted by energizing at a coating voltage ($V_1$) of 1-50 V for 10-360 seconds with the metallic substrate serving as the cathode, and the second and subsequent stage electrocoating is conducted by energizing at a coating voltage ($V_2$) of 50-400 V for 60-600 seconds with the metallic substrate serving as the cathode, the difference between the coating voltage ($V_2$) and the coating voltage ($V_1$) being not less than 10 V.

2. A method according to claim 1, in which the water-based film-forming agent (I) contains 50-10,000 ppm in terms of the metallic mass of the zirconium compound (A).

3. A method according to claim 1, in which the zirconium compound (A) is selected from the group consisting of zirconyl nitrate, zirconyl acetate, zirconyl sulfate, zirconium hydrofluoric acid, and zirconium hydrofluoric acid salts.

4. A method according to claim 1, in which the diepoxide compound (a1) has a molecular weight within a range of 230-2,000.

5. A method according to claim 1, in which the bisphenol epoxy resin (a2) has a number-average molecular weight within a range of 340-2,000 and an epoxy equivalent within a range of 170-1,500.

6. A method according to claim 1, in which the bisphenols (a3) are the compounds represented by the following general formula (3):

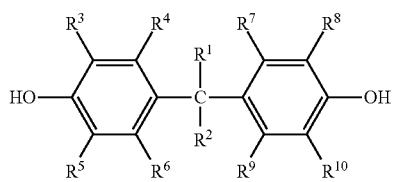

Formula (3)

[in the formula, each of $R^1$, $R^2$, $R^3$, $R^4$, $R^5$, $R^6$, $R^7$, $R^8$, $R^9$ and $R^{10}$ stands for hydrogen atom or a $C_{1-6}$ alkyl group].

7. A method according to claim 1, in which the amount used of the diepoxide compound (a1) is within a range of 20-70 mass % based on the total solid content of the diepoxide compound (a1), bisphenol epoxy resin (a2) and bisphenols (a3); and within a range of 15-50 mass % based on the solid content of the amino group-containing modified epoxy resin (B).

8. A method according to claim 1, in which the amount used of the bisphenol epoxy resin (a2) is within a range of 11-53 mass % based on the total solid content of the diepoxide compound (a1), bisphenol epoxy resin (a2) and bisphenols (a3).

9. A method according to claim 1, in which the amino group-containing modified epoxy resin (B) has a number-average molecular weight within a range of 600-3,000 and an amine value within a range of 30-100 mgKOH/g solid resin.

10. A method according to claim 1, in which the water-based film-forming agent (I) contains 40-80 mass % of the amino group-containing modified epoxy resin (B), based on the total solid content of the resin component.

11. A method according to claim 1, in which the water-based film-forming agent (I) further comprises blocked polyisocyanate compound.

12. A method according to claim 1, in which the first stage electrocoating is carried out by energization at a coating voltage ($V_1$) of 2-40 V for 30-300 seconds.

13. A method according to claim 1, in which the second and subsequent stage electrocoating is carried out by energization at a coating voltage ($V_2$) of 100-350 V for 90-240 seconds.

14. A method according to claim 1, in which the difference between the coating voltage ($V_2$) and coating voltage ($V_1$) is within a range of 15-50 V.

* * * * *